(12) United States Patent
Rameshni et al.

(10) Patent No.: US 9,023,309 B1
(45) Date of Patent: May 5, 2015

(54) PROCESS OF CONVERSION SULFUR COMPOUNDS TO ELEMENTAL SULFUR BY USING DIRECT REDUCTION AND OXIDATION CATALYSTS IN CLAUS UNITS

(71) Applicants: Mahin Rameshni, Monrovia, CA (US); Stephen L. Santo, La Crescenta, CA (US)

(72) Inventors: Mahin Rameshni, Monrovia, CA (US); Stephen L. Santo, La Crescenta, CA (US)

( * ) Notice: Subject to any disclaimer, the term of this patent is extended or adjusted under 35 U.S.C. 154(b) by 0 days.

(21) Appl. No.: 14/276,317

(22) Filed: May 13, 2014

(51) Int. Cl.
C01B 17/04 (2006.01)
C07C 7/148 (2006.01)

(52) U.S. Cl.
CPC ......... *C01B 17/0456* (2013.01); *C07C 7/14841* (2013.01)

(58) Field of Classification Search
CPC .. C01B 17/04; C01B 17/0404; C01B 17/0473
USPC ........................................................ 423/573.1
See application file for complete search history.

(56) References Cited

U.S. PATENT DOCUMENTS 7,544,344 B2 * 6/2009 Graville .................... 423/573.1

FOREIGN PATENT DOCUMENTS

CA 2419628 C * 1/2010 ............. B01D 53/52
EP 1171138 A1 * 1/2002 ........... C01B 17/0404

* cited by examiner

*Primary Examiner* — Timothy Vanoy (57) ABSTRACT

Processes are for the conversion of the sulfur compounds to elemental sulfur through different catalytic stages after the reaction furnace of the Claus unit with air or oxygen. The steps are: 1—Conventional Claus thermal or catalytic stage; 2—Oxygen Scavenger catalytic stage to capture excess oxygen from the reaction furnace and to perform Claus reaction; a Selective Reduction stage that converts SO2 to elemental sulfur; and 4—Selective Oxidation stage that converts H2S to elemental sulfur. The tail gas flows to the incineration and stack and to the incineration plus caustic scrubber for achieving zero emissions.

20 Claims, 3 Drawing Sheets

PROCESS OF CONVERSION SULFUR COMPOUNDS TO ELEMENTAL SULFUR BY USING DIRECT REDUCTION AND OXIDATION CATALYSTS IN CLAUS UNITS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

This disclosure relates generally to Processes for the conversion of the sulfur compounds to elemental sulfur through different catalytic stages after the reaction furnace of the Claus unit with air or oxygen operation. The first stage or and the second stage of the Claus unit consists of combination of oxygen scavenger catalyst as known as "AM" catalyst which performs as the oxygen scavenger as well as Claus catalyst for any excess oxygen from the reaction furnace burner and the conventional Claus catalyst which is Alumina or combination of alumina and titanium. The third stage will be the direct reduction catalyst consists but no limited to Fe, Ni, Mo, Mn, and Al, for direct conversion of SO2 to sulfur based on the patent reference, U.S. Pat. No. 6,297,189 B1. Finally the fourth stage consists of selective direct oxidation catalyst consists but not limited to Fe, Zn, Mg, Zn, and Cr catalyst for direct conversion of H2S to sulfur without any limitation Using above more selective catalysts are to enhance much higher recovery compare to the conventional Claus up to 99.90% and to produce additional elemental sulfur. The maximum sulfur recovery in the conventional Claus is 93-97% wherein the remaining un recovered sulfur components requires larger tail gas unit. In this new innovation the tail gas feed could be processed in much smaller tail gas treating unit due to much higher recovery. In addition, the caustic scrubber is added after the incineration to meet the zero emission near 100% sulfur conversion.

DESCRIPTION OF THE RELATED ART

The most commonly used process for recovering elemental sulfur from sulfur compounds is the modified Claus process. The modified Claus process can achieve the sulfur recovery of ranging 93-97% depends of the acid gas feed compositions. The tail gas stream from the Claus unit has to be further processed in one of the common tail as unit technology; tail gas hydrogenation process followed by the amine tail gas to recover the remaining sulfur compounds by achieving about 99.9% recovery. The treated gas from the tail gas absorber flows to the incineration system where the stack has to meet the required emission of SO2 less than 250 ppmv. In United States and many other countries if the tail gas unit is down the Claus unit has to be shut down due to low sulfur recovery and violation of the emission and they are required to have a backup tail gas unit for such cases.

Sulfur plant operation is a very complicated and challenging job. Acid gas feed to a sulfur plant usually includes wide variation in the volume and concentration of sulfur and other compounds, including a substantial amount of ammonia or amine in some plants. Theoretically, control of the thermal stage(s) using air, enriched air or oxygen for conversion of H2S to SO2 has permitted some processes to obtain extremely high recovery of sulfur whether for the 2:1 ratio for H2S to SO2 or for H2S-shifted operation. In actual operation, the several interactions of stream component analysis and measurement of flow, temperature, pressure and other process parameters with the compressors, valves, burners, aging or fouled catalyst beds and other process equipment has made error-free, continuous recovery of sulfur from acid gas an elusive goal. The present invention makes a further improvement in the pursuit of that goal by eliminating or reducing the importance of such careful control of the H2S/SO2 ratio at 2:1 for the conventional Claus plants or H2S-shifted operation for the SuperClaus and EuroClaus plants.

The capital cost of the building tail gas unit is very close to the cost of building a modified Claus unit considering for using it to recover only the remaining sulfur compounds which were not recovered in the Claus unit.

This invention could be used for the existing Claus units by making the required modifications and for new sulfur recovery units to achieve much higher sulfur recovery.

In similar application, (U.S. Pat. No. 6,214,311 B1, Apr. 10, 2001, Kwong, V.) describes a process for reduction of sulfur compounds to sulfur. The main and key problems with this scheme are that the reduction catalyst is very sensitive to oxygen. Excess Oxygen from the thermal stage reaction furnace and burner flows to the catalytic stage and deactivate the catalyst. This scheme is neither reliable nor practical. In addition the scheme uses a reduction catalyst (U.S. Pat. No. 5,494,879, Feb. 27, 19996, Chang, S.) where the inventor discovered the sensitivity issues of the catalyst in actual operation specially to oxygen and the catalyst have been improved significantly and patented under (U.S. Pat. No. 6,297,189 B1, Oct. 2, 2001, Chang, S.) resulting a better reduction catalyst However, where no provision for oxygen scavenger still has been considered.

The inventor has communicated with The Regents of the University of California, through the Ernest Orlando Lawrence Berkeley National Laboratory and agreed to support commercializing of the catalyst under U.S. Pat. No. 6,297,189 B1, as one of the catalysts in this invention; processing of direct reduction of SO2 to sulfur. The inventor added the special features by developing an scheme to make the use of the reference catalyst practical and to establish a robust and reliable process for various applications.

One of the commercial processes that use the final selective oxidation stage is the SuperClaus or EuroClaus process. The SuperClaus or EuroClaus process uses an H2S-shifted Claus operation (higher H2S:SO2 ratio than 2:1) in combination with a selective reduction and oxidation step. The SuperClaus or EuroClaus consists of a thermal stage followed by two or three Claus stages including reduction catalyst and one final selective oxidation stage. The thermal stage and the Claus catalytic stages are operated under an H2S-shifted Claus operation, either by reducing the combustion air to the main burner of the thermal stage or by-passing a portion of the Claus feed gas around the main burner, in order to minimize the residual SO2 in the gas leaving the last Claus stage since any residual SO2 entering the selective oxidation stage will not be converted to elemental sulfur. Under this mode of operation, the H2S in the gas leaving the last Claus reactor is controlled, instead of controlling the H2S:SO2 ratio to 2:1 in a conventional Claus unit, before it is fed to the last selective oxidation stage in which H2S is oxidized to elemental sulfur. The selective oxidation catalyst employed is substantially insensitive to the presence of water vapor in the process gas and ineffective in promoting the reverse Claus reaction. The overall sulfur recovery for the SuperClaus and EuroClaus process can be more than 99% to 99.2%, depending on the feed gas composition and the number of catalytic stages. By eliminating the hydrogenation step and the water removal step, as required by the other tail gas processes, the additional capital cost for substituting a SuperClaus stage for a 3rd Claus stage is claimed to be 15-20% higher than the Claus unit and 30-40% higher for the EuroClaus. However, operating the thermal stage and the Claus stages at higher H2S:SO2 ratio reduces the overall sulfur recovery efficiency of the front-end section of the process which results in a shift of the sulfur recovery load to the final selective oxidation stage. Due to normal plant fluctuations in acid gas feed composition and process conditions, the last catalytic oxidation stage can be subjected to high H2S feed and subsequent temperature excursion, which may require reactor bypass or plant shutdown.

Another commercial process that uses the direct reduction catalyst and selective oxidation stage is the EuroClaus where consists of direct reduction catalyst plus the SuperClaus concept. In this process, the same issue remains where the oxygen from the thermal section will damage the direct reduction EuroClaus. No provision for oxygen scavenger has been considered.

This application for patent discloses processes for the direct reduction and direct oxidation of sulfur compounds to sulfur with the provision of oxygen scavenger after the thermal section or the reaction furnace in the Claus unit. In addition, the caustic scrubber is added after the incineration to meet the zero emission.

BRIEF SUMMARY OF THE INVENTION

The present invention relates to a process for recovering sulfur from sulfur compounds wherein a process gas at least containing SO2 derived from a thermal stage or a lean stream catalytic stage first flows through the oxygen scavenger stage to capture any oxygen, then in combination with the Claus process is directly reduced to elemental sulfur. The direct oxidation stage is followed after the direct reduction stage for further conversion of sulfur compounds to sulfur. The present disclosure incorporates by reference U.S. Pat. No. 6,297,189 B1 to allow the conversion of concentrated sulfur dioxide to elemental sulfur.

In accordance with aspects of the present invention, the process comprises a thermal stage for an H2S-rich acid gas feed or catalytic stage (such as a Selectox catalyst stage) for an H2S-lean acid gas feed where H2S is oxidized at least in part to SO2 or where a process gas is obtained with a reactionable amount of SO2 in the presence of a significant amount of H2S.

The acid gases are processed in the thermal section are the amine acid gas and the sour water stripper gases containing but not limited to H2S, NH3, HCN, H2, CO, CO2, O2 COS, N2, CS2, hydrocarbons, mercaptans, sulfur vapors and steam water.

The thermal section consists of the reaction furnace burner operates with air, enriched air with oxygen up to 100% oxygen as combustion agent. For low H2S concentration natural gas supplement is added to boost the combustion temperature.

In accordance with the present invention, the reaction furnace consists of at least one refractory vessel for air operation and more than one refractory vessel for oxygen enrichment operation to control the combustion temperature. Each vessel consists of minimum one or two zones.

In the thermal stage, reducing gases such as H2 and CO are formed via dissociation reactions under overall sub-stoichiometric combustion; in the thermal stage and the Claus stage(s), elemental sulfur is produced according to the Claus reaction.

In accordance with first aspects of the present invention, the process comprises one or more catalytic stages in which consists of oxygen scavenger catalyst also performs as a Claus catalyst such as "AM" catalyst for the Claus reaction of (2H2S+SO2→2H2O+3/n Sn) produces elemental sulfur.

In accordance with second aspects of the present invention, the process comprises one or more subsequent catalytic stages where SO2 is selectively reduced to elemental sulfur by reaction with H2, CO, or other reducing gases in a reduction catalyst system substantially as described in U.S. Pat. No. 6,297,189 B1.

Reducing gases such as CO and H2 can be generated internally at the thermal stage for reaction at the SO2 catalytic reduction stage. If additional reducing gas is required, if appropriate reducing gas is available, it can also be added directly to the process stream. The gas leaving the selective catalytic direct reduction stage, containing mostly residual H2S, is reacted in a selective catalytic oxidation stage in which most of the residual H2S is selectively oxidized to elemental sulfur in the presence of significant amount of water vapor.

In accordance with third aspects of the present invention, the gas containing H2S, SO2, H2 and CO is reacted in a selective catalytic direct reduction stage in which most of the residual SO2 is selectively reduced to elemental sulfur in the presence of significant amount of water vapor. In this section; the process comprises one or more catalytic stages where SO2 is selectively reduced to elemental sulfur.

Process air, oxygen enriched air or oxygen is added to the last catalytic stage for the production of elemental sulfur in accordance with the selective oxidation reaction.

By combining the conventional Claus thermal and catalytic stages, the selective reduction stage and the selective oxidation stage, an overall sulfur recovery efficiency of over 99.7% can be obtained.

In accordance with fourth aspects of the present invention, the process comprises, wherein, the tail gas from the Claus unit is processed in the tail gas processing units such as Cansolv, incineration with or without caustic scrubber.

The tail gas is further processed in any tail gas processes of incineration with Caustic scrubber to achieve 100% sulfur recovery efficiency.

In one preferred embodiment, H2S (hydrogen sulfide) in the acid gas feed is partially oxidized with oxygen in a thermal stage before further conversion in one or more Claus catalytic stages. The H2S:SO2 ratio in the gases reacted in the Claus stage is preferably at 2:1, although the process of the present invention may be practiced with a ratio of higher or lower than 2:1 without significantly affecting the overall sulfur recovery efficiency of the process.

The new invention comprises the rate of the air, enriched air or oxygen enrichment stream is adjusted such that the mole ratio of hydrogen sulfide to sulfur dioxide in the gaseous-mixture reaction stream ranges from 2:1 or lower to about 10:1.

The new invention comprises the supplement of external hydrogen and CO as a reducing agent is provided to the step 3 of reduction catalytic stage to promote the conversion of $SO_2$ to $H_2S$.

The new invention offers the following advantages:
(1) The catalytic stage contains oxygen scavenger to prevent deactivation of the direct reduction catalyst. This is the key difference of this invention versus all other current technologies.
(2) The increasingly intense preoccupation with H2S:SO2 ratio is virtually eliminated. The front-end section comprises a thermal stage feeding its effluent to the Claus catalytic stages, the effluent preferably having an H2S:SO2 ratio of 2:1 for optimal sulfur recovery efficiency in accordance with the Claus reaction. If the Claus section is operated off-ratio, either lower or higher than the preferred 2:1 ratio for the Claus section, the incremental amounts of either SO2 and H2S can be essentially be converted to elemental sulfur in the subsequent selective reduction stage or the selective oxidation stage. This process feature offers easy and forgiving control as compared to (1) the conventional Claus process which require the control of the H2S:SO2 ratio at 2:1 and (2) the SuperClaus or EuroClaus process which must control of the inlet H2S concentration at the selective catalytic oxidation reactor by operating the Claus section at H2S-shifted mode (H2S:SO2 ratio much higher than 2:1).
(3) No hydrogenation reaction is required since the residual SO2 from the last Claus catalytic stage is converted to elemental sulfur in the selective reduction stage. This process feature offers a reduction in capital cost as compared to conventional tail gas treating processes. The process and equipment modifications associated with providing reducing gas if necessary are thus directed to direct SO2 reduction instead of hydrogenation.
(4) No water removal step is required since both the selective catalytic direct reduction stage and the selective catalytic oxidation step are substantially insensitive to the presence of water vapor in the tail gas. This process feature offers a reduction in capital cost as compared to conventional BSR type tail gas treating processes.
(5) Within the control fluctuations and deviations created under actual operating conditions of the modern sulfur plants, typical operation of the thermal stage in such sulfur plants with the modified Claus process produces more than the necessary stoichiometric amount of reducing gases for the subsequent selective reduction reactions which convert SO2 to elemental sulfur with this first embodiment. Additional reducing gas would rarely be needed.
(6) For the non-H2S-shifted sulfur recovery process, an SO2 catalytic reduction stage as a penultimate conversion stage reduces by 50% or more the inlet concentration of H2S to a final selective oxidation stage as compared to the SuperClaus processes, where such comparison is based on the same number of catalytic reactors. This process feature reduces potential temperature excursion problems across the selective catalytic oxidation stage and, subsequently, providing better protection for the direct oxidation catalyst used in that stage as well as reducing reactor/plant downtime.
(7) Based on calculation of the results expected from operation of the direct reduction catalyst system of U.S. Pat. No. 6,297,189 B1 and its currently predicted modified system within the combined Claus process of the first embodiment, a set of three catalytic reactors (a single oxygen scavenger plus Claus catalytic stage, a single selective catalytic direct reduction stage, and a single selective catalytic oxidation stage) can obtain more than 99.7% overall sulfur recovery, which is substantially higher than other processes, such as the conventional 3-stage Claus and the 3-stage SuperClaus, at a capital cost similar to the conventional Claus process. The discovery of a method to obtain an incremental percentage increase in sulfur recovery over the prior art is especially significant at these high recovery ranges.
(8) An existing 3-stage Claus plant, with a typical overall recovery of 93-98% of sulfur from the acid gas feed, can be easily modified as a retrofit to a 3-stage plant with the following sequence of stages: catalytic Claus stage, SO2 catalytic reduction stage and H2S catalytic oxidation stage. The modification improves sulfur recovery to minimum of 99.7% with minimal modifications and cost.
(9) CO emissions to atmosphere from any source is coming under scrutiny by government and other bodies controlling environmental quality. The present invention provides a significant CO reduction in the sulfur recovery train gas passed through the SO2 catalytic reduction stage.

Many plants must recover sulfur from lean sulfur streams (from trace amounts to 30 mole percent) for which it is not suitable to apply a thermal stage due to the difficulty in sustaining stable flames therein. In conjunction with a catalytic first stage using a catalyst such as Selectox, the present invention is also applicable to more completely recover elemental sulfur from lean streams, for both the non-recycle and recycle processes using Selectox or similar catalysts. The recycle process uses a cooled first stage effluent recycled to the inlet of the first stage to control temperature rise across the stage. For acid gas streams with less than about 5 mole percent H2S, no recycle is generally needed.

Another embodiment of the present invention comprises using a complete or partial stage of SO2 reduction catalyst as a method to selectively control the relative amounts of H2S and SO2 in the effluent. It has been found that the SO2 reduction catalyst used for the present invention selectively converts SO2 over H2S to elemental sulfur in an SO2 catalytic reduction stage. Results indicate that selective conversion may be controlled by varying the catalyst bed temperature, such that fairly low conversion of H2S is obtained at higher temperatures (around 340 C) and relatively high conversion at lower temperatures (around 200 C) while maintaining a relatively constant conversion of SO2 over that same range.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes for the conversion of sulfur compounds to elemental sulfur using direct reduction and oxidation catalysts.

The present invention relates to processes for recovering sulfur for onshore and offshore applications; refineries, gas plants, IGCC, gasification, coke oven gas, mining and minerals sour gas field developments, and flue gas desulfurization wherein sulfur recovery unit is required for new units or revamps.

In accordance with aspects of the present invention, it is an object of the present disclosure to provide a process for producing elemental sulfur economically acceptable for, present day industrial operations.

Another object is to provide such a process which can tolerate variances in operating conditions within a given range without major equipment adaptations. A further object is to provide a process which can be utilized in co-acting phases to provide, at acceptable economics, the capacity required in present-day industrial operations.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

In the reaction furnace, the hydrocarbon containing gas stream comprises one or more hydrocarbons selected from the group consisting of alkanes, alkenes, alkynes, cycloalkanes, aromatic hydrocarbons, and mixtures thereof.

The figures illustrate steam reheaters that heats up the gas by using steam, however, any suitable heat exchanger, using different heating media, or fired reheaters using natural gas or acid gas, and hot gas bypass maybe employed in this service.

The figure illustrates a waste heat boiler that produces steam, however, any suitable heat exchanger, such as a water heater, steam superheater or feed effluent exchanger may be employed in this service.

The reaction furnace is equipped with one or more checker wall or choke ring.

The first and the second converter comprises oxygen scavenger catalyst as known as "AM" catalyst and at least one Claus catalyst, consisting of alumina, promoted alumina, and titania.

The converters in the Claus conversion step of this present process disclosure, employ one or more Claus catalysts including alumina catalysts, activated alumina catalysts (such as S-100 SR catalysts), alumina/titania catalysts, and/or titania catalysts, Iron with Zinc, Iron with Nickel, Cr, Mo, Mn, Co, Mg with promoter on Alumina and with any other combination or any other catalyst systems which are employed in the Claus process, the catalysts having a range of surface area, pore volume, shapes (e.g., star shaped, beads, or powders), and percent catalyst content (in non-limiting example, from about 50 wt. % to about 95 wt. % $Al_2O_3$, having a purity up to about 99+%), without any limitations. The Claus processes within converter and subsequent converters, such as converter may be carried out at conventional reaction temperatures, ranging from about 200° C. to about 1300° C., and more preferably from about 240° C. to about 600° C., as well as over temperature ranges between these ranges, including from about 210° C. to about 480° C., and from about 950° C. to about 1250° C., without limitation.

The third converter or direct reduction converter catalyst comprises the direct reduction catalyst containing at least Fe, Ni, Cr, Mo, Mn, CO with promoter alumina and with any combination as described in the U.S. Pat. No. 6,297,189. A layer of Co/Mo (cobalt-molybdenum) catalyst may be used at the bottom of the reactor to scavenge any remaining $H_2$ and CO.

The fourth converter or direct oxidation converter catalyst comprises the direct oxidation catalysts containing at least Fe, ZN, Mg, Al, and Cr with any combination.

The number of Claus conversion steps employed, which may range from one stage to more than ten, depends on the particular application and the amount of sulfur recovery required or desired. In accordance with certain non-limiting aspects of the present disclosure, the number and placement of multiple converters/reactors, and the associated condenser systems, may be adjusted without affecting the overall thermal reduction process described herein.

The process is typically able to achieve an overall sulfur recovery efficiency of greater than about 98%, and preferably greater than 99.5%, based on the theoretical amount of recoverable sulfur.

With continued reference to the invention, the tail gas stream upon exiting the last reaction stage may optionally be conveyed to any typical tail gas absorption process, Cansolv process or any type of incineration process including caustic scrubber to increase sulfur recovery efficiency to about 100%.

Accordance to the present invention the detailed description of the figures are in 4 steps: Step 1—Conventional Claus thermal stage with high intensity burner; step 2—an Oxygen Scavenger catalytic stage or stages plus at least one Claus catalyst to capture excess oxygen from the reaction furnace and to perform Claus reaction; step 3—a Selective Reduction stage that converts SO2 to elemental sulfur; and step 4—a Selective Oxidation stage that converts H2S to elemental sulfur.

The last condenser is at least one heat exchanger or multiple heat exchangers, dual condensers or combination of water coolers and air coolers to achieve maximum sulfur condensation and sulfur recoveries.

The recovering process from catalytic zones of the catalytic stages comprises cooling the product gas stream in one or more sulfur condensers to condense and recover elemental sulfur from the product gas stream.

In the reaction furnace, the hydrocarbon containing gas stream comprises one or more hydrocarbons selected from the group consisting of alkanes, alkenes, alkynes, cycloalkanes, aromatic hydrocarbons, and mixtures thereof.

The new invention comprises that the reduction catalyst will convert SO2 to sulfur with the SO2 concentration of 10-30% for desulfurization applications and with the SO2 concentration of 1-2% in the Claus tail gas.

The new invention comprises that the reduction catalyst is used to convert SO2 to sulfur in the catalytic stages up to the temperature of 600 C.

The new invention comprises that the reduction catalyst will convert SO2 to sulfur in the catalytic stages capable of operating at the space velocity of up to 15,000 hr-1.

The new invention comprises that the sulfur recovery of up to 99.9% is achieved.

The tail gas stream from the last condenser flows to the sulfur coalescer vessel to recover any entrained sulfur, where the recovered sulfur flows to the sulfur pit and the tail gas feed flows to the incineration.

Figure 1:
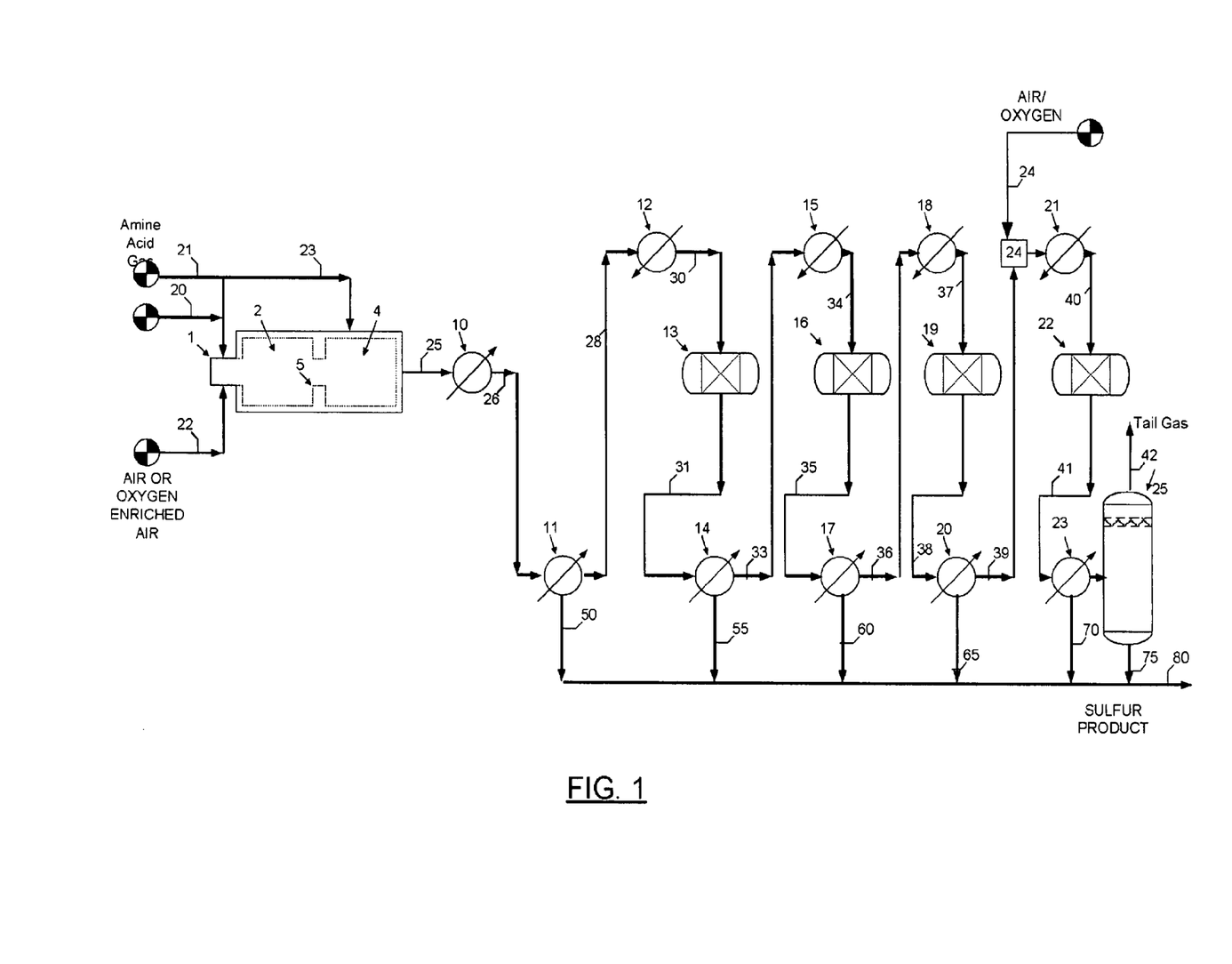
FIG. 1 illustrates a schematic diagram embodiment of the present disclosure consisting of thermal section, 4-stage including two oxygen scavengers, one direct reduction stage, and one direct oxidation stage.

Turning now to the FIG. 1, in the reaction furnace (1) the acid gas streams, streams 20 and 21 are partially oxidized with air, enriched air or oxygen, stream 22 in the reaction furnace combustion chamber zones; (no. 2 and no. 4) according to the basic chemistry of the Claus process. The acid gas stream is split into two streams where stream 21 is combined with the ammonia acid gas and the remaining of the amine acid gas stream 23 flows to the second zone of the reaction furnace (4) to provide enough flexibility to the operators by adjusting the split flow to achieve the required combustion temperature for destruction of ammonia and hydrocarbons. The choke ring or checker wall located inside of the reaction furnace is shown (5). The sulfur is formed as a vapor, and other forms of elemental sulfur are formed in the gas. Combustibles in the gas will burn along with the H2S, and sulfur compounds are formed with their combustion products. Also, H2S will dissociate at high temperature forming hydrogen and elemental sulfur.

Sulfur is formed thermally in the reaction furnace and the products from the exothermic reactions stream 25 are cooled in the Waste Heat Boiler (10) by generating high pressure steam and then stream 26 further cooled in the No. 1 condenser (11) which generates low pressure steam.

The condensed sulfur is separated from the gas in a coalescer section that is integral within each condenser and fitted with a stainless steel wire mesh pad to minimize sulfur entrainment. The sulfur stream 50 drains from the condenser through a sulfur seal and sample box to the sulfur pit.

The outlet gas from the No. 1 condenser (11) stream 28 is heated indirectly in the No. 1 reheater (12) by high pressure steam and then stream 30 enters the No. 1 converter (13) which the converter contains an oxygen scavenger catalyst; as known as "AM" catalyst to capture the excess oxygen from the thermal section of this invention (1) plus contains Claus catalyst types such as alumina and titanium catalyst to perform the Claus reaction; as the results Sulfur is formed by an exothermic reaction, which creates a temperature rise across the catalyst bed. The converter No. 1 effluent stream 31 is then cooled in the No. 2 condenser (14) by generating low pressure steam and the condensed sulfur stream 55 is drained to the sulfur pit.

Similarly, for the second stage, No. 2 Converter (16) the gas from the condenser No. 2 stream 33 is reheated indirectly with steam in the No. 2 reheater (15). The Converter No. 2 contains oxygen scavenger "AM catalyst" to capture the excess oxygen from the thermal stage (1), and Claus catalysts such as Alumina and Titanium catalysts.

Sulfur is formed in the No. 2 converter (16). The converter effluent stream 35 is cooled in the No. 3 condenser (17) and the condensed sulfur stream 60 is drained to the sulfur pit.

For the third stage, No. 3 Converter (19) the gas from the No. 3 condenser (17) stream 36 is reheated indirectly with steam in the No. 3 reheater (18). In the 3rd converter, more than 90% of the remaining SO2 is reduced to elemental sulfur, in the presence of a highly selective SO2 reduction catalyst developed by reducing gases (H2 and CO) produced in the reaction furnace as well as by H2S by using direct reduction catalyst reference to U.S. Pat. No. 6,297,189 B1. Sulfur is formed in the No. 3 converter (19). The converter effluent stream 38 is cooled in the No. 4 condenser (20) and the condensed sulfur stream 65 is drained to the sulfur pit.

The direct reduction catalyst in the third converter as described consisting of Fe, Ni, Co, Al and other component as described in reference U.S. Pat. No. 6,297,189, B1.

It will be readily appreciated that the reduction catalyst stage, either singly or in combination with a preliminary Claus catalytic stage, improves sulfur recovery over that of a typical commercial Claus catalytic stage train by introducing to the process conversion of SO2 to sulfur without the necessity of the presence of a ratio-specific amount of H2S.

For the fourth stage, the gas stream 39 from the No. 4 condenser (20) is mixed in the mixer (24) with air or enriched air stream 24 then reheated indirectly with steam in the No. 4 reheater (21). The reheated process gas stream 40 is entered the fourth converter (22).

In the 4th converter (22), more than 90% of the remaining H2S is reacted with O2 to form elemental sulfur in the presence of selective oxidation catalyst. The converter effluent stream 41 is cooled in the fifth sulfur condenser (23) before the tail gas is routed to a thermal oxidizer. Then the tail gas stream 42 flows to the incinerator through a coalescer to remove any additional sulfur entrained.

An oxygen analyzer located at the outlet of the fifth sulfur condenser is used to control the process air added to the selective oxidation converter.

The direct oxidation catalyst consists of Fe, Zn, Mg, and Cr as minimum with different combinations.

The Direct oxidation catalyst has demonstrated its flexibility in adapting to various swings in process operating conditions, such as high and low turndown feed rates, various water contents (up to 40%), and various H2S concentrations in the feed. Under this wide range of operating conditions, the direct oxidation catalyst maintains its high activity and selectivity. The Direct oxidation catalyst promotes the selective direct oxidation of H2S to sulfur.

Figure 2:
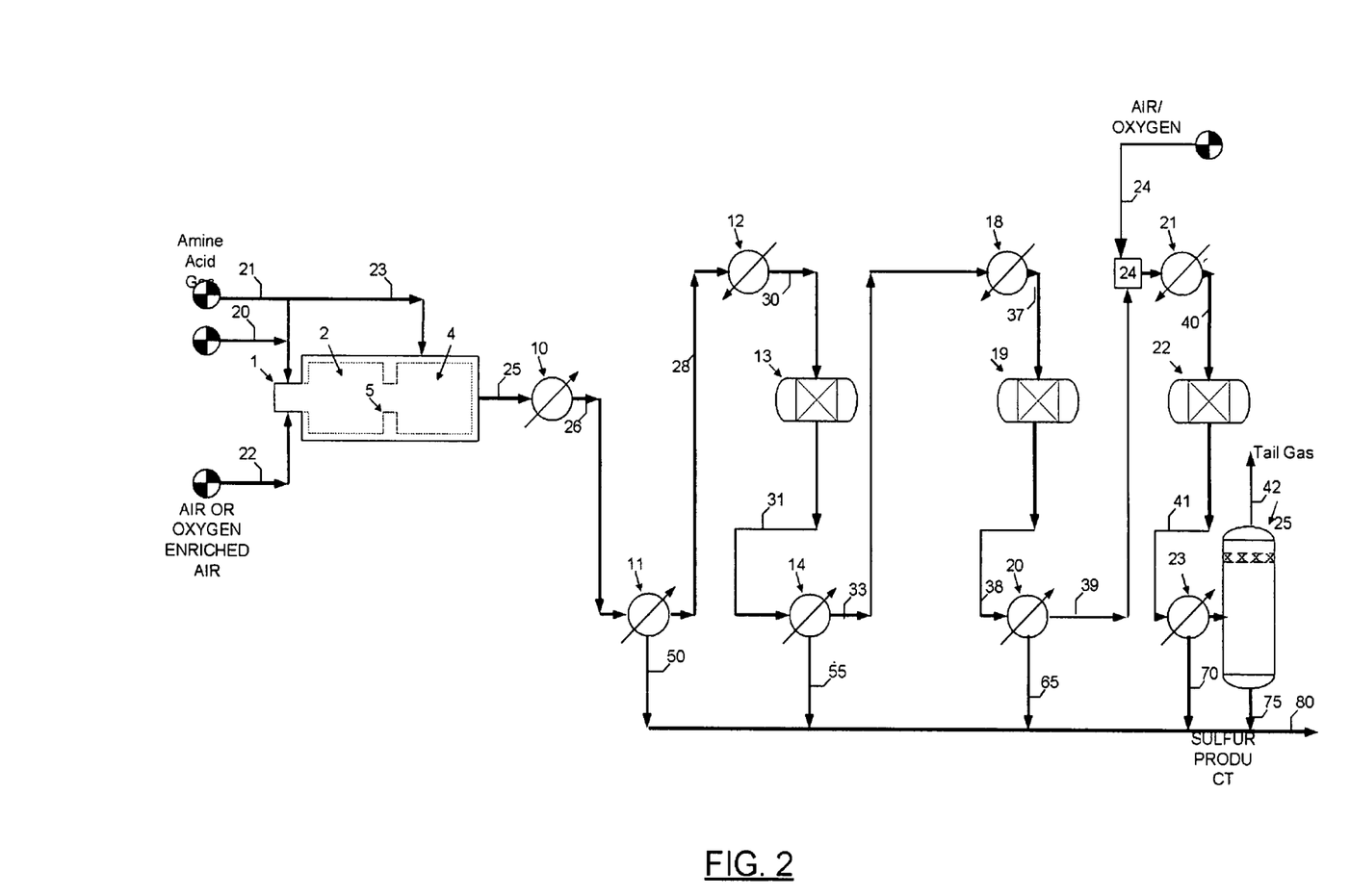
FIG. 2 illustrates a schematic diagram of an alternate embodiment of the present disclosure consisting thermal section, 3-stage including one oxygen scavengers, one direct reduction stage, and one direct oxidation; stage

Turning to FIG. 2, where the concept and the description is the same as FIG. 1 except the oxygen scavenger step is conducted only in one stage then followed by the direct reduction stage is employed in the second converter and the direct oxidation stage is employed in the third converter with the association of the condensers and reheaters. The thermal stage also remains the same as FIG. 1.

In FIG. 2, compare to FIG. 1, the no. 1 converter represents oxygen scavenger and the Claus reactor, the no. 2 converter represents the direct reduction reactor and the no. 3 converter represents the direct oxidation reactor.

As described herein, the liquid sulfur recovered by the disclosed processes is typically collected in a sulfur pit or other appropriate collection device or approved location, and may be removed as appropriate, such as by sulfur pump or pump system to be handled by others, or shipped as appropriate.

The tail gas from FIG. 1 or FIG. 2 is routed to the conventional thermal or catalytic incineration and then followed by the conventional stack; the maximum overall recovery is up to 99.7%. If near zero emission or near 100% recovery is required then the thermal incineration will be followed by the caustic scrubber to absorb any SO2 and the conventional stack is eliminated. The detailed of thermal incineration with caustic scrubber is provided below as FIG. 3.

Figure 3:
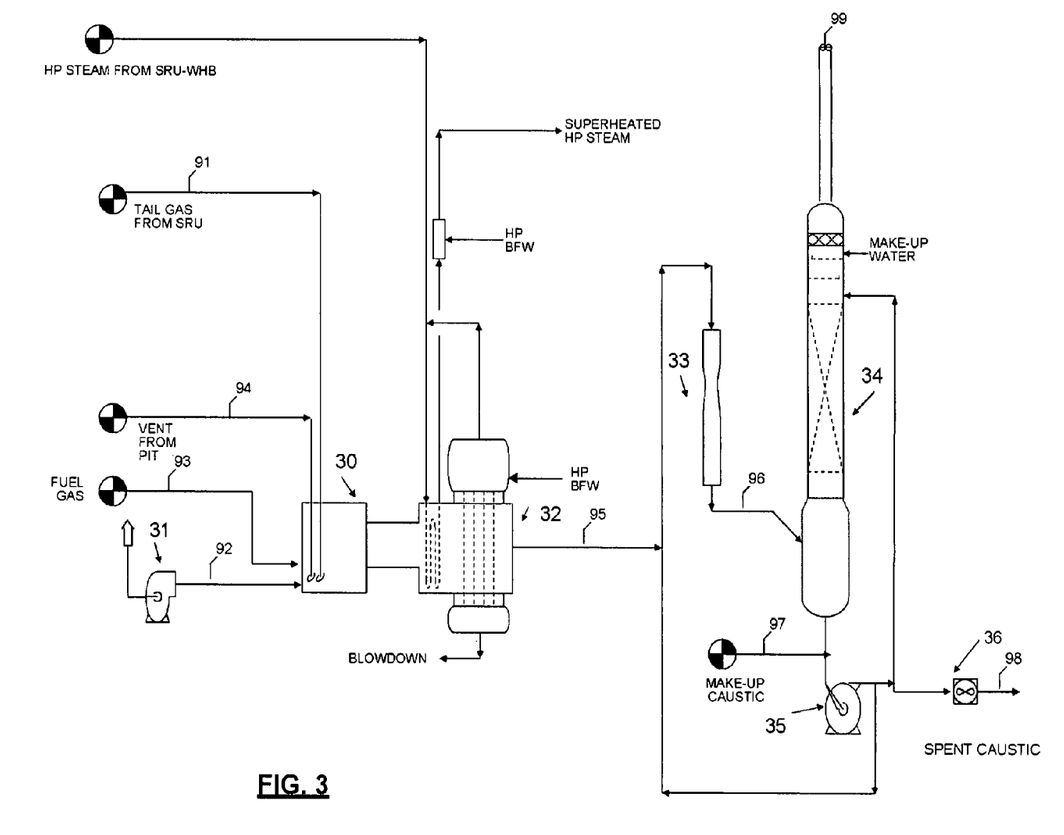
FIG. 3 illustrates a schematic diagram of an alternate embodiment of the present disclosure consisting incineration with caustic scrubber.

Turning to FIG. 3, where near zero emission is achieved due to high sulfur recovery in this invention; the waste stream from spent caustic is not significant and can be sent to the water treatment system.

According to the SO2 absorption by caustic, basically 2.5 tons of caustic for each ton of sulfur would be required.

The thermal incinerator (30) receives air stream 92 from the incineration air blower (31), the fuel gas stream 93, the pit vents if any from the sulfur pit and storage stream 94 and the tail stream 91 from the invention process.

The tail gas stream 91 is sent to the Incinerator. The residual H2S and other sulfur compounds in this gas stream are oxidized to convert all the sulfur compounds to SO2.

The flue gas is cooled in a waste heat boiler (32) by generating high-pressure steam. The high-pressure steam along with the excess high-pressure steam from the SRU is superheated in the superheater coil of the incinerator waste heat boiler before exporting to the high-pressure steam header. The incinerated flue gas is routed to the caustic scrubber instead of stack to meet the emission.

The outlet from the incinerator waste heat boiler enters the venturi scrubber (33) and is contacted with the caustic circulation pump (35) to be cooled further. The cooled stream 96 then enters caustic scrubber (34) to absorb the SO2 from the gas. The gas stream 99 leaving the caustic scrubber (34) will contain less than 10 ppmv of SO2 which is routed through a short stack to a safe location.

It may be required to heat the stack gas prior to emitting to the atmosphere to prevent condensation. In some cases gas/gas heat exchanger might be used to cool the gas entering the caustic system further and to heat the gas from the caustic scrubber.

Fresh make up stream 97 is added to the caustic scrubber which gets re-circulated to the tower with the makeup water enters at the top. The spent caustic is then cooled in the caustic cooler (36) and the stream 98 is sent to the water treatment system.

The effluent gas from the Incinerator Waste Heat Boiler is desuperheated in a venturi scrubber by intimate contact with a 10 wt % caustic solution. During the liquid vapor contact a portion of the SO2 is removed from the vapor and the gas is cooled.

The liquid-vapor mixture then flows to the caustic scrubber. The vapor flows up through the packed bed of the caustic scrubber against a countercurrent stream of 10 wt % caustic solution to scrub the remaining SO2 from the tail gas. The treated gas leaving the caustic scrubber will contain low ppm levels of SO2.

Due to the temperature of the gas leaving the Incinerator Waste Heat Boiler there is a constant vaporization of water in the caustic scrubber which needs to be made up. This make up water is added to the column at the upper bubble trays to knock any remaining entrained caustic out of the vapor to minimize caustic loss. The caustic system uses a non-regenerable caustic (NaOH in water) to remove the SO2 from the tail gas. The SO2 that is removed slowly decreases the caustic strength of the solution so fresh caustic is added to replace this spent caustic. The Spent caustic is purged on level control and cooled before being sent off-plot for disposal.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents.

We claim:

1. A process for the production of sulfur from sulfur compounds containing acid gases streams, the process comprising the following 4 steps:
    A—step 1) The process comprises a thermal stage(s) (reaction furnace stages) of the Claus Unit with air, enriched air or oxygen enrichment operation;
    B—step 2) The process comprises at least one catalytic stages containing oxygen scavenger catalyst to capture the excess oxygen from the first step, plus at least one Claus catalysts to perform the Claus reaction;
    C—step 3) The process comprises at least one catalytic stage containing the reduction catalyst for conversion of SO2 to sulfur and;
    D—step 4) The process comprises at least one catalytic stage containing the oxidation catalyst for conversion of H2S to sulfur by mixing air, enriched air or oxygen to the process gas entering the reactor.

2. The process of claim 1, wherein, the acid gas streams consists of at least one member selected from the group consisting of H2S, NH3, HCN, H2, CO, CO2, O2 COS, N2, CS2, hydrocarbons, mercaptans, sulfur vapors and steam water.

3. The process of claim 1, wherein, the step 1 of the thermal stage reaction furnace is replaced with another catalytic stage for acid gases with low H2S concentration known as lean acid gas.

4. The process of claim 1, wherein the step 1 reaction furnace is equipped with one or more checker wall or choke ring.

5. The process of claim 1, wherein, the catalytic stages comprises one or more Claus catalysts including alumina catalysts, activated alumina catalysts, alumina/titania catalysts, and/or titania catalysts, Iron with Zinc, Iron with Nickel, Cr, Mo, Mn, Co, Mg with promoter on Alumina and with any other combination or any other catalyst systems which are employed in the Claus process, the catalysts having a range of surface area, pore volume, and shapes, the The Claus processes within converter and subsequent converters may be carried out at conventional reaction temperatures, ranging from about 200° C. to about 1300° C., and from about 240° C. to about 600° C.

6. The process of claim 1, wherein, the step 2 of the catalytic stages is consisting from the group of Claus catalysts of titania in the top section of the catalytic stage which is resistant to oxygen carryover from the thermal stage and at least one Claus catalyst, consisting of alumina, promoted alumina, and titania.

7. The process of claim 1, wherein, the step 3 of the catalytic stages comprises the direct reduction catalyst containing at least Fe, Ni, Cr, Mo, Mn, CO with promoter alumina and also cobalt-molybdenum catalyst at the bottom of the reactor to scavenge any remaining H2 and CO.

8. The process of claim 1, wherein, the step 4 of the catalytic stages comprises the direct oxidation catalyst is selected from the group consisting of at least Fe, ZN, Mg, Al, and Cr with any combination.

9. The process of claim 1, wherein, the tail gas is sent to the conventional thermal incineration with caustic scrubber for achieving zero emission.

10. The process of claim 1, wherein, the tail gas is further processed in any tail gas processes or any type of incineration to achieve 100% sulfur recovery efficiency.

11. The process of claim 1, wherein, the rate of the air, enriched air or oxygen enrichment stream is adjusted such that the mole ratio of hydrogen sulfide to sulfur dioxide in the gaseous-mixture reaction stream ranges from 2:1 to 10:1.

12. The process of claim 1, wherein, the supplement of external hydrogen and CO as a reducing agent is provided to the step 3 of reduction catalytic stage to promote the conversion of SO2 to H2S.

13. The process of claim 1, wherein the recovering process from catalytic zones of the catalytic stages comprises cooling the product gas stream in one or more sulfur condensers to condense and recover elemental sulfur from the product gas stream.

14. The process of claim 1, wherein, the last condenser is at least one heat exchanger or multiple heat exchangers, dual condensers or combination of water coolers and air coolers to achieve maximum sulfur condensation and sulfur recoveries.

15. The process of claim 1, wherein, in the reaction furnace, the hydrocarbon containing gas stream comprises one or more hydrocarbons selected from the group consisting of alkanes, alkenes, alkynes, cycloalkanes, aromatic hydrocarbons, and mixtures thereof.

16. The process of claim 1, wherein, the reduction catalyst will convert SO2 to sulfur with the SO2 concentration of 10-30% for desulfurization applications and with the SO2 concentration of 1-2% in the Claus tail gas.

17. The process of claim 1, wherein, the reduction catalyst is used to convert SO2 to sulfur in the catalytic stages up to the temperature of 600 C.

18. The process of claim 1, wherein, the reduction catalyst will convert SO2 to sulfur in the catalytic stages capable of operating at the space velocity of up to $15,000^{hr-1}$.

19. The process of claim 1, wherein, the sulfur recovery of up to 99.9% is achieved.

20. The process of claim 1, wherein, the tail gas stream from the last condenser flows to the sulfur coalescer vessel to recover any entrained sulfur.

* * * * *